US008006200B2

(12) United States Patent
Griffith et al.

(10) Patent No.: US 8,006,200 B2
(45) Date of Patent: Aug. 23, 2011

(54) FACILITATED SEARCH FOR ONLINE COLLABORATION PLATFORM

(75) Inventors: Petra Griffith, Santa Monica, CA (US); Vineet Gossain, Mountain View, CA (US); Claude Jones, San Marcos, CA (US); James Nieters, Sunnyvale, CA (US); Todd Barlok, Trussville, AL (US); Matthew Catrow Crampton, Sunnyvale, CA (US); Naga Viswanathan Malepati, San Marcos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 583 days.

(21) Appl. No.: 12/189,095

(22) Filed: Aug. 8, 2008

(65) Prior Publication Data

US 2010/0037163 A1 Feb. 11, 2010

(51) Int. Cl.
*G06F 3/048* (2006.01)
*G06F 3/00* (2006.01)
*G06F 7/00* (2006.01)
*G06Q 30/00* (2006.01)

(52) U.S. Cl. ........ 715/816; 715/765; 715/733; 715/738; 715/741; 715/744; 715/760; 705/14.73; 705/14.4; 707/706; 707/713; 707/723

(58) Field of Classification Search ................... 715/765, 715/816, 733, 738, 741, 744, 760; 705/14.4, 705/14.73; 707/706, 713, 723
See application file for complete search history.

(56) References Cited

U.S. PATENT DOCUMENTS

| 7,890,526 B1* | 2/2011 | Brewer et al. ................. 707/767 |
| 2007/0100651 A1* | 5/2007 | Ramer et al. ....................... 705/1 |
| 2008/0244429 A1* | 10/2008 | Stading ........................ 715/764 |
| 2009/0024465 A1* | 1/2009 | Burckart et al. ................ 705/14 |
| 2009/0094145 A1* | 4/2009 | Kim et al. ....................... 705/34 |
| 2010/0105370 A1* | 4/2010 | Kruzeniski et al. ........ 455/414.3 |

* cited by examiner

*Primary Examiner* — Ting Lee
(74) *Attorney, Agent, or Firm* — Martine Penilla & Gencarella, LLP

(57) ABSTRACT

In an example embodiment, an online advertising management platform receives a login that identifies a user as a user allowed access to an account maintained by the platform. The platform displays a toolbar having a textbox that allows the user to search for data relating to all accounts to which the user has access. The platform displays a combo box after the user enters a fixed number of characters in the textbox. The combo box includes a list of descriptions of each data object that is accessible and that is relevant to the fixed number of characters. The platform locates the combo box contiguous to the toolbar over some but not all of the view displaying the data relating to the order. The platform displays a data object, rather than a page of search results, after the user clicks a description of a data object from the combo box.

16 Claims, 17 Drawing Sheets

FACILITATED SEARCH FOR ONLINE COLLABORATION PLATFORM

RELATED APPLICATIONS

This application is related to U.S. patent application Ser. No. 12/189,083 entitled "Utility Toolbar for Online Collaboration Platform", U.S. patent application Ser. No. 12/189,088 entitled "Notification Controls for Online Collaboration Platform", U.S. patent application Ser. No. 12/189,091 entitled "Window Overlay for Online Collaboration Platform", and U.S. patent application Ser. No. 12/189,100 entitled "Searching by Object Category for Online Collaboration Platform", filed contemporaneously with this application. The disclosures of these related applications are hereby incorporated herein by reference.

BACKGROUND

Collaboration platforms are an emerging category of computer software. Typically, such platforms offer a set of software components and services that enable individuals to find each other and the information that they need to be able to communicate and work together to achieve a common business goal. In some implementations, the elements of a collaboration platform which are domain-agnostic might include messaging (e.g., emails, calendaring and scheduling, and contacts), team collaboration (e.g., file synchronization, task/project management, and full-text search), social computing tools (e.g., wiki, blog, tagging, RSS, and shared bookmarks), and real-time communication (e.g., presence, instant messaging, application/desktop sharing, and audio/video/web conferencing). Online implementations of collaboration platforms might be colloquially referred to as Enterprise 2.0, by analogy to Web 2.0.

A portal has designed an online collaboration platform in the advertising domain. The platform is called an advertising management platform and it can include an ad network, an ad server, an ad exchange, enterprise CRM functionality (e.g., for target marketing and account management), and enterprise DSS (decision support system) functionality (e.g., a digital dashboard), among other components. An ad network is a group of sites that a portal or a media company can sell collectively to an advertiser. An ad network might sell text ads, display ads, video ads, ads in video, or other advertising inventory. Publishers use an ad server to decide which ads to show and to help manage their advertising inventory, while advertisers and agencies use an ad server to simplify the ad-reporting process. In an ad exchange, buyers and sellers trade advertising inventory in an online central market in real time, like in a stock exchange. Networks put advertising inventory into the ad exchange to be bought, most often by another seller, who needs the impressions to fulfill an advertiser request. Through the ad exchange, buyers can gain access to a pool of inventory that might not have been available through any one vendor.

The workflows in such a platform tend to be complex, since they require a large amount of human-computer interaction from users assuming myriad roles with varying access rights to the data maintained by the platform. Consequently, there is a need for a graphical user interface (e.g., a model-view-controller) that employs personalization and/or contextualization to facilitate the efficient and effective use of the platform.

SUMMARY

In an example embodiment, a computer-implemented method is described for an online advertising management platform. In the method's first operation, the platform receives a login that identifies a user as a user allowed access to an account maintained by the platform. In the method's second operation, the platform displays a toolbar. The toolbar includes a textbox that allows the user to search for data relating to all accounts to which the user has access. In the method's third operation, the platform displays a combo box after the user enters a fixed number of characters in the textbox. The combo box includes a list of descriptions of each data object maintained in the platform that is accessible and that is relevant to the fixed number of characters. In the method's fourth operation, the platform displays a data object, rather than a page of search results, after the user clicks a description of a data object from the combo box.

In another example embodiment, a computer-implemented method is described for an online advertising management platform. In the method's first operation, the platform receives a login that identifies a user as a user allowed access to an account maintained by the platform. The account includes data relating to an order for advertising provided by an ad network affiliated with the platform. In the method's second operation, the platform displays a view in a graphical user interface including a window displaying some or all of the data relating to the order. In the method's third operation, the platform displays a toolbar in a standardized location relative to the window. The toolbar includes a textbox that allows the user to search for data relating to all accounts to which the user has access. In the method's fourth operation, the platform displays a combo box after the user enters a fixed number of characters in the textbox. The combo box includes a list of descriptions of each data object maintained in the platform that is accessible and that is relevant to the fixed number of characters. In the method's fifth operation, the platform locates the combo box contiguous to the toolbar over some but not all of the view displaying the data relating to the order so that the user can see both the combo box and the view at the same time. In the method's sixth operation, the platform displays a data object, rather than a page of search results, after the user clicks a description of a data object from the combo box.

In another example embodiment, persistent executable logic is described for an online advertising management platform. The executable logic receives a login that identifies a user as a user allowed access to an account maintained by the platform. The account includes data relating to an order for advertising provided by an ad network affiliated with the platform. The executable logic displays a view in a graphical user interface including a window displaying some or all of the data relating to the order. The executable logic displays a toolbar in a standardized location relative to the window. The toolbar includes a textbox that allows the user to search for data relating to all accounts to which the user has access. The executable logic displays a combo box after the user enters a fixed number of characters in the textbox. The combo box includes a list of descriptions of each data object maintained in the advertising management platform that is accessible and that is relevant to the fixed number of characters. The executable logic locates the combo box contiguous to the toolbar over some but not all of the view displaying the data relating to the order so that the user can see both the combo box and the view at the same time. The executable logic displays a data object, rather than a page of search results, after the user clicks a description of a data object from the combo box.

Other aspects and advantages of the invention will become apparent from the following detailed description, taken in conjunction with the accompanying drawings, which illustrates by way of example the principles of the invention.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

In a use case for the online advertising management platform, a newspaper with both print and online publications might be a member of the advertising network associated with the platform. An account representative for the newspaper (e.g., Joe Smith of SG Newspaper) might manage the advertising campaigns for several of the newspaper's advertising clients, by regularly logging onto the platform as a user. Additionally, a sales representative for the newspaper (e.g., Dina Joseph of SG Newspaper) might track the progress of a campaign for an advertising client, by occasionally logging onto the platform as a user. It will be appreciated that the advertising campaign might involve online display advertising in the online edition of the newspaper (e.g., graphics-heavy banners and column ads), display advertising in the print edition of the newspaper, contextual (or search) advertising on the results page for the portal's search engine, display advertising on the website of another member of the advertising network, etc.

Figure 1:
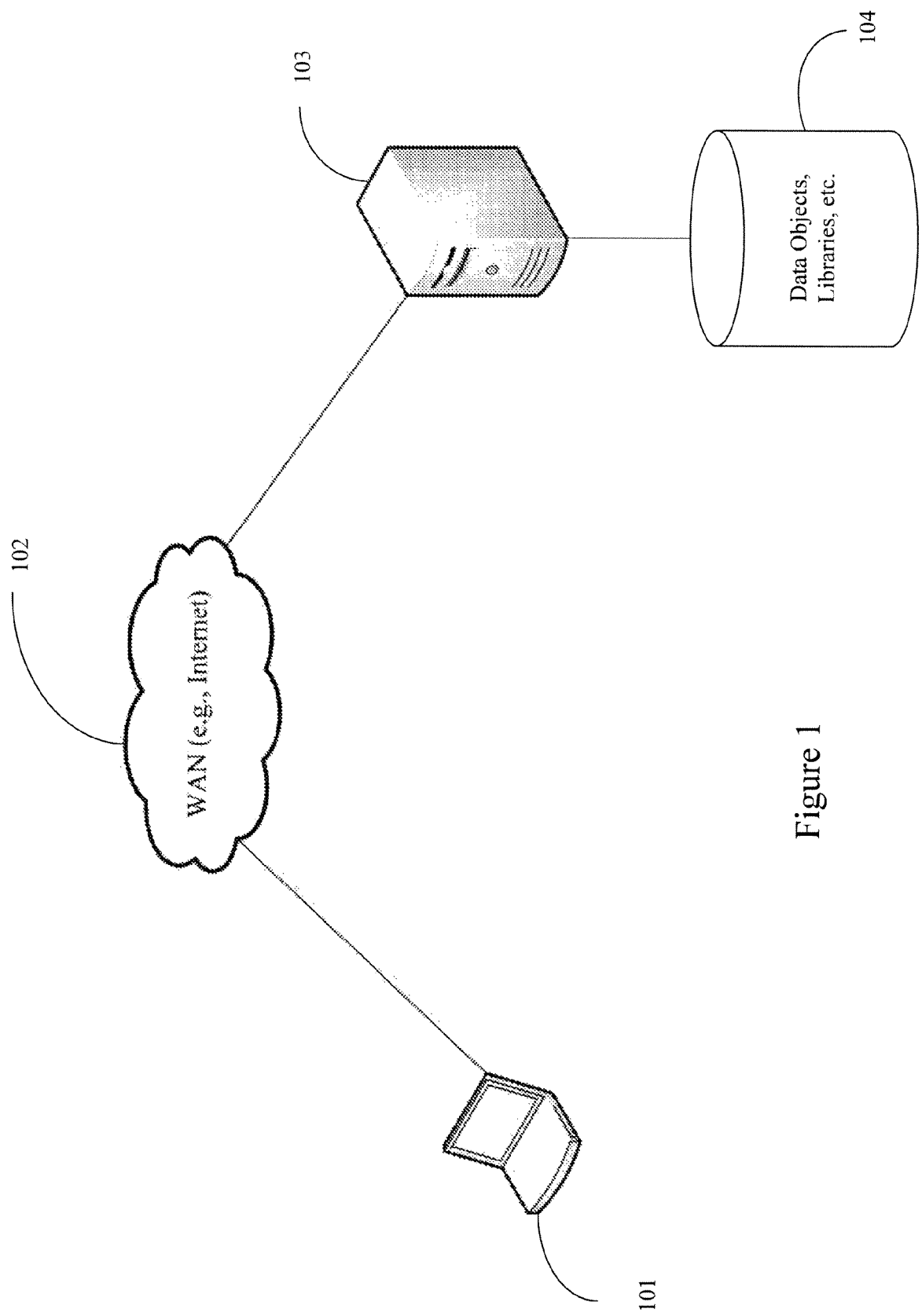
FIG. 1 is a simplified network diagram for an online advertising management platform, in accordance with an example embodiment.

FIG. 1 is a simplified network diagram for an online advertising management platform, in accordance with an example embodiment. As shown in FIG. 1, client device 101 accesses server 103 through a wide area network (WAN) such as the Internet 102. In an example embodiment, client device 101 might be a laptop computer (shown), a desktop computer, a cellular phone, a smart phone, a wireless handheld device, a personal digital assistant (PDA), or any other access device which is capable of connecting to a network through an application program (e.g., a web browser). Server 103 might be a general-purpose computer that is one of a number of servers (or nodes) in a distributed computing system such as a cluster. In an example embodiment, server 103 might be a web server running LAMP (Linux Apache MySQL PHP) or some similar software solution stack and the advertising management platform might comprise a web application program employing HTML, XML, JavaScript, etc. As depicted in FIG. 1, server 103 is connected to a persistent storage system (e.g., a disk array, a storage area network or SAN, etc.) 104 which persistently stores software (e.g., a library with code for "instant searching") used by an advertising management platform and executed by server 103. Persistent storage system 104 also stores data (e.g., objects in a database) used by the advertising management platform. In an example embodiment, client device 101 might also store in memory and/or persistent storage (e.g., hard disk) some of the data and some of the software (e.g., AJAX code, a browser toolbar add-on, or other client application program) used by the advertising management platform. That is, the advertising management platform might consist of numerous code (or encoded logic) modules, some of which execute on client device 101 and some of which execute on server 103, using data stored on the client side (e.g., client 101) and/or on the server side (e.g., server 103 and persistent storage system 104).

Figure 2:
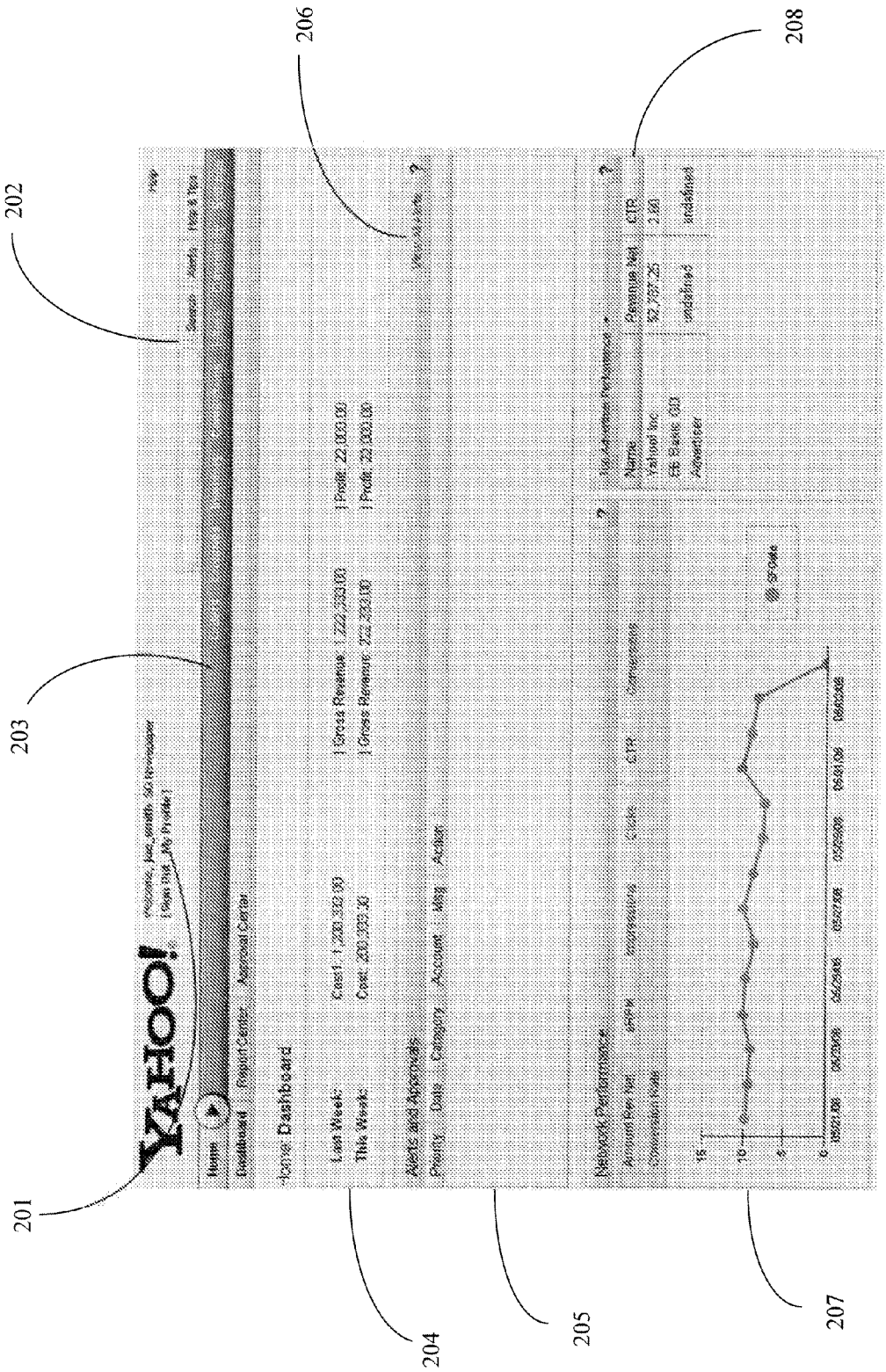
FIG. 2 is a digital dashboard with a utility toolbar for an online advertising management platform, in accordance with an example embodiment.

FIG. 2 is a digital dashboard with a utility toolbar for an online advertising management platform, in accordance with an example embodiment. In an example embodiment, an account manager (e.g., Joe Smith of SG Newspaper) or a sales representative (e.g., Dina Joseph of SG Newspaper) might see digital dashboard 200 after logging onto the platform. The platform will only display the digital dashboard 200 to those users who have the right to access it, pursuant to the policies governing the platform. As indicated by link label 201, each user of the digital dashboard 200 has a profile which a user can use to customize (or personalize) the views displayed by the platform's graphical user interfaces (GUIs), including the digital dashboard 200, within the confines of the user's access rights. Digital dashboard 200 includes a utility toolbar 202 which is located in a standardized location (e.g., in the upper right corner) in each platform GUI displaying the toolbar 202, in order to facilitate learning and use of the platform by users. In turn, the toolbar 202 includes standardized controls comprising associated with a button labeled "Search", a tabbed window labeled "Alerts", and a tabbed window labeled "Helps & Tips". In an example embodiment, the "Search" textbox might enable searches within the platform for data objects (e.g., document files, graphics files, etc.) that are accessible by the user. An "Alert" might be an informational message pertaining to an exception within the context of the GUI (e.g., dashboard or view) which is displaying the toolbar 202, as explained below. A "Tip" might be a recommended action or practice within the context of the GUI (e.g., dashboard or view) which is displaying the toolbar 202, as explained below.

Digital dashboard 202 includes a horizontal bar 203 which lists some object categories frequently used by the platform: (a) Orders for an account, which will be discussed below; (b) Creatives (e.g., a graphics file); (c) Inventory (e.g., advertising space in an online newspaper); (d) Connections (e.g., between data objects and their attributes); (e) Filters (e.g., for use in searches within the platform); (f) Community (e.g., for exchange of user-group information); and (g) Settings (e.g., for configuration of external interfaces such as GUIs). In an example embodiment, digital dashboard 202 includes a pane 204 containing summary accounting information in the form of Gross Revenue from orders accessible by the user (e.g., $1,222,333.00), the Cost from all orders accessible by the user (e.g., $1,200,333.00), and the resulting Profit (e.g., $22,000.00), as a function of time (e.g., Last Week and This Week).

Digital dashboard 202 also includes a pane 205 which shows a list summarizing all "Alerts" and "Approvals" relating to orders accessible by the user and a tabbed window labeled "View All Alerts" that allows the user to view each of the alerts accessible by the user rather than just summaries of those alerts. In an example embodiment, digital dashboard 202 includes two additional views. Pane 207 includes performance measures such as ePRM or effective revenues per millennium or 1000 page views, impressions, clicks, CTR or click-through rate, and conversions, relating to the advertising network of which the user's publisher (e.g., newspaper) is a member. Pane 208 includes performance measures (e.g., net revenue and CTR) for the top advertisers among the clients of the user's publisher.

Figure 3:
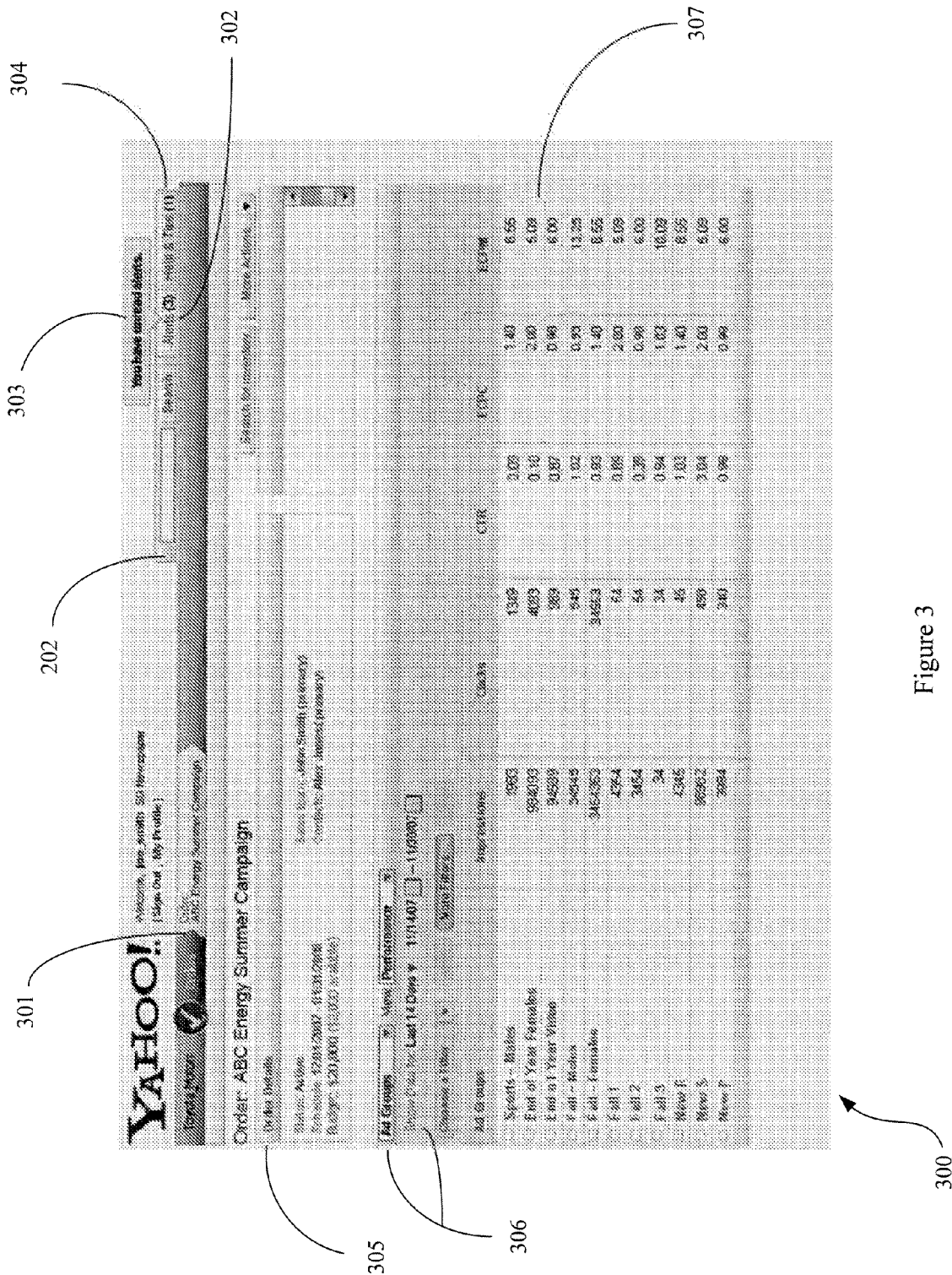
FIG. 3 is a view with order data and a utility toolbar showing a notification balloon for alerts, in accordance with an example embodiment.

FIG. 3 is a view with order data and a utility toolbar showing a notification balloon for alerts, in accordance with an example embodiment. In an example embodiment, an account manager (e.g., Joe Smith of SG Newspaper) or a sales representative (e.g., Dina Joseph of SG Newspaper) might see view 300 after clicking on the label "Orders" in the digital dashboard and then clicking on an order from the list of accessible orders displayed by the platform. This sequence is captured in the hierarchy shown in the horizontal bar 301, where the label "Orders" is followed by the label "Order: ABC Energy Summer Campaign". View 300 also includes a utility toolbar 202 which is located in the standardized location (e.g., the upper right corner). In view 300, the toolbar 202 includes a tabbed window 302 labeled "Alerts (3)", whose tab is connected to a balloon 303 that states: "You have unread alerts." In an example embodiment, the alerts in tabbed window 302 might relate to the order data shown elsewhere in view 300, e.g., in pane 305, entry boxes 306, and pane 307. The alerts relate to matters involving the platform's model/content, not matters involving the user interface. Thus, for example, an alert might indicate that an ad for the order was editorially declined or that an ad group for the order was underperforming by not serving enough impressions. It will be appreciated that an ad group might be a set of ads and related keywords that are defined for a specific campaign, in this context.

The number in the tab (e.g., 3) for tabbed window 302 indicates the number of alerts that have not been dismissed by the user who is logged in, regardless of whether the alerts have been previously dismissed by another user who has access to the order. In this manner, the platform facilitates asynchronous collaboration by a team of users, e.g., a publisher's employees and agents. In an example embodiment, the platform does not automatically dismiss an alert that has been read, so that the number in the tab will not change if the user reads an alert but does not dismiss the alert. However, the platform will not display a notification balloon 303 if all alerts have been read by the current user.

Also, in an example embodiment, the balloon 303 is displayed for a fixed period of time whose duration is proportional to the priority of the highest priority alert that has not been read by the user who is logged in. Building on the example above, a balloon might be displayed for seven seconds if it concerned an ad that was editorially declined, whereas a balloon might be displayed for only five seconds if it concerned an ad group that was underperforming by not serving enough impressions.

In view 300, the toolbar 202 includes a tabbed window 304 labeled "Help & Tips (1)". The number in the tab (e.g., 1) for tabbed window 304 indicates the number of tips that have not been read by the user who is logged in, regardless of whether the tips have been previously read by another user who has access to the order. In an example embodiment, the platform might automatically dismiss a tip once it has been read, e.g., opened. In an alternative example embodiment, the platform might allow a user to dismiss a tip using GUI views and controls similar to those that allow a user to dismiss an alert, as described elsewhere. A tip might recommend an action or practice to improve the performance of the order's advertising. Tabbed window 304 might also provide a link label to the platform's online help, which might comprise help with respect to both substantive (e.g., workflow) and technical (e.g., user interface) matters.

As mentioned above, view 300 also includes pane 305, entry boxes 306, and pane 307. In an example embodiment, pane 305 might include "Order Details" such as the status of the order (e.g., active), the schedule for the order (Dec. 1, 2007-Jan. 31, 2008), and the budget for the order (e.g., $20,000 with $2,000 available), as well as the sales team and contacts for the order. Entry boxes 306 allow a user to create a filter for viewing data related to an order. In FIG. 3, the user has created a filter that shows the performance for an order based on the order's ad groups for a particular time period (e.g., the last 14 days: Nov. 14, 2007-Nov. 30, 2007). Also, as shown in FIG. 3, view 300 allows a user to save a filter that the user has created and use it at a subsequent time. In this regard, see the dropdown list labeled "Choose a Filter" and the labeled button "More Filters". Pane 307 in FIG. 3 shows the results of applying the filter shown in entry boxes 306 to the data relating to an order. Pane 307 includes a table showing particular performance statistics (e.g., impressions, clicks, CTR, eCPC or estimated cost per click, and eCPM or cost per thousand impressions) for particular ad groups (e.g., "Sports-Males", "End of Year Females", "End of Year Video", etc.).

Figure 4:
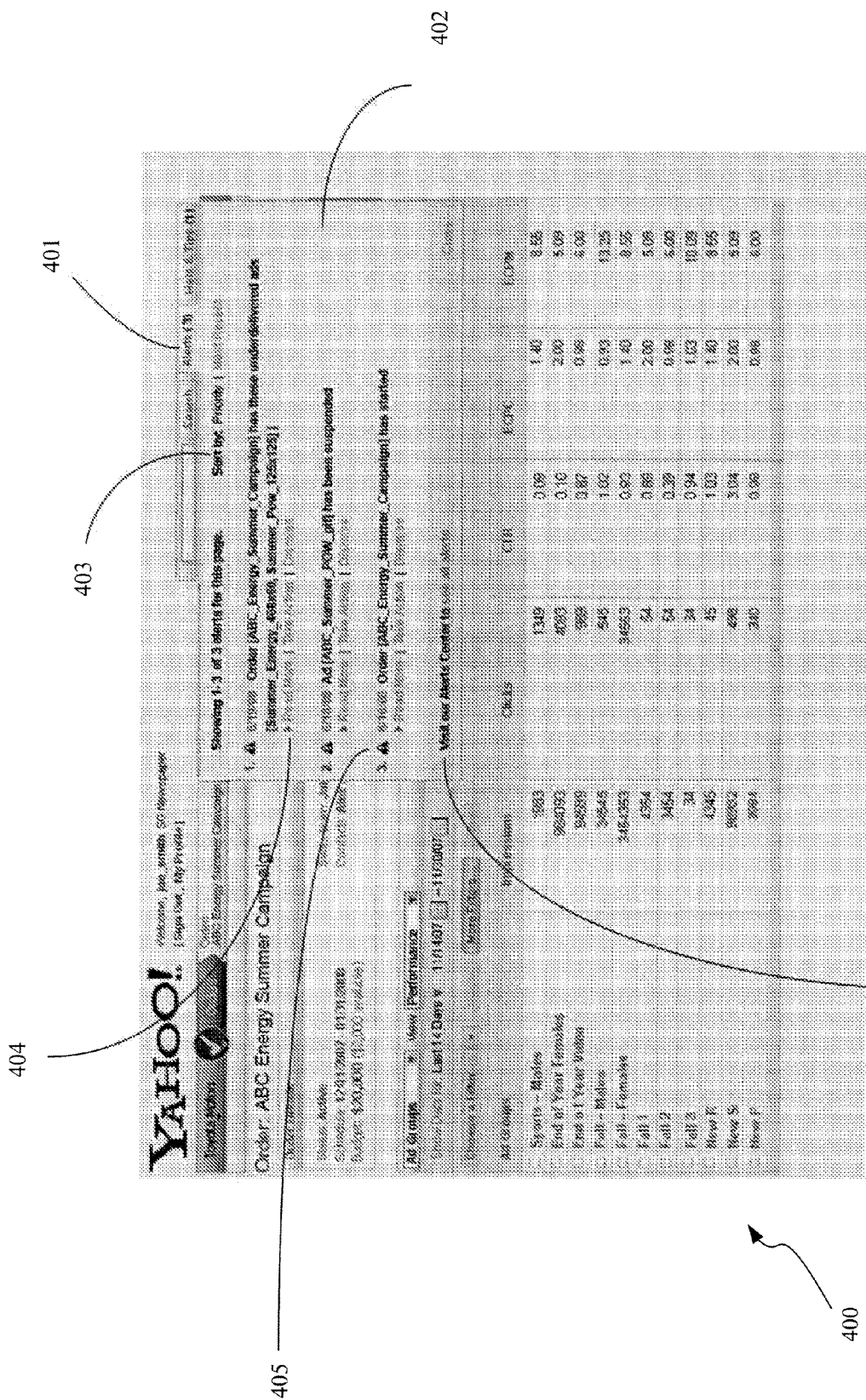
FIG. 4 is a view with order data and a utility toolbar showing a list of alerts, in accordance with an example embodiment.

FIG. 4 is a view with order data and a utility toolbar showing a list of alerts, in accordance with an example embodiment. In an example embodiment, the platform might display view 400 when a user clicks on tab 401, which includes a label "Alerts (3)" indicating that this particular user has three alerts which he/she has not read. View 400 includes a tabbed window 402 which displays a numbered list showing a creation date and a summary for each alert. Each summary is depicted with typographical emphasis in the form of boldface to indicate that the alert has not been read (e.g., opened) by this particular user. It will be appreciated that other sorts of typographical emphasis, such as italics or a different background color might be used in alternative example embodiments. As indicated by the label 403, "Sort by", at the top of tabbed window 402, the platform allows the user to sort the alerts by priority or recentness (e.g., most recent date of creation first). In example embodiments, priority might be determined by urgency with respect to time or by significance with respect to dollar amount in absolute or relative terms.

Below each alert displayed in the list in tabbed window 402, is a horizontal menu 404 which allows the user to: (a) read more about the alert, e.g., the details of the alert, as opposed to simply the alert's summary; (b) take action with respect to the alert, e.g., by removing offensive text or imagery from an ad that was editorially declined; or (c) dismiss the alert. Next to each message in the list in tabbed window 402 is a warning sign 405 (e.g., an exclamation mark in a triangle), whose color might communicate additional information about the alert, in an example embodiment. For example, in the list in window 402, messages 1 and 2 might have a warning sign that is red to indicate that a workflow is not proceeding per plan (e.g., "Order [ABC_Energy_Summer_Campaign] has these undelivered ads [Summer_Energy__468×60, Summer_Pow__125×125]" and "Ad [ABC_Summer__POW_gif] has been suspended", respectively), whereas message 3 might have a warning sign that is black to indicate a milestone in a workflow relating to an order (e.g., "Order [ABC_Energy_Summer_Campaign] has started"). It will be appreciated that ABC_Summer_POW_gif might be a creative in the form of a display ad implemented in the GIF (Graphics Interchange Format) file format, whereas Summer_Energy__468×60 and Summer_Pow__125×125 might be display ads implemented in a bitmap format, in an example embodiment.

At the bottom of list in tabbed window 402 is a link label 406 that allows a user to go to a global alert page which lists all of alerts that the user is allowed to access, regardless of the order to which each of the alerts relates. It will be appreciated that the alerts listed in the list in tabbed window 402 are context-dependent and relate to the order data displayed outside the boundaries of tabbed window 402, e.g., the order data for the ABC Energy Summer Campaign. It will also be appreciated that the platform locates tabbed window 402 contiguous to the utility toolbar in view 400 so that tabbed window 402 does not completely obstruct the displayed order data for the ABC Energy Summer Campaign, allowing a user to see and work with both the order data and the list in tabbed window 402 at the same time.

Figure 5:
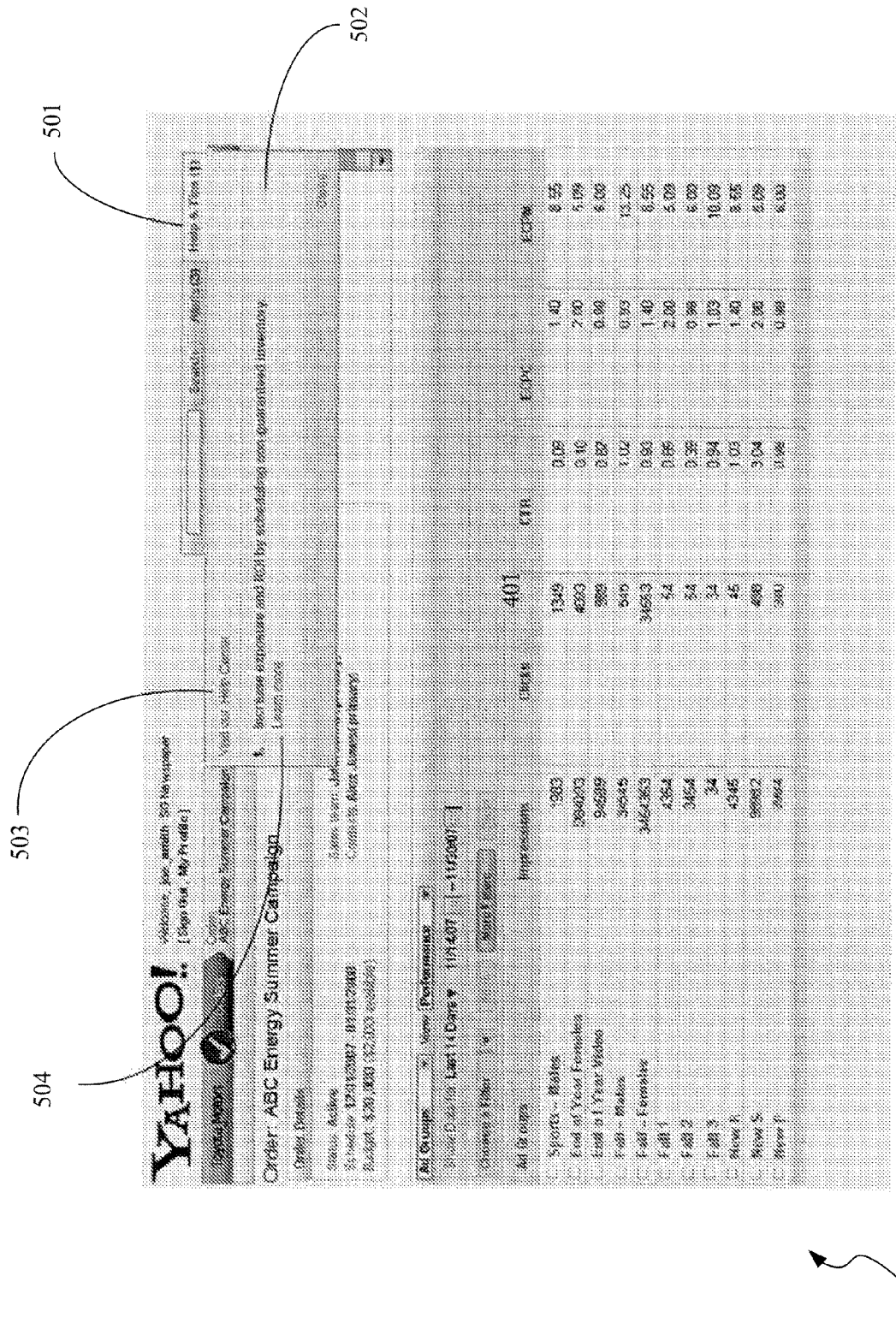
FIG. 5 is a view with order data and a utility toolbar showing a tip, in accordance with an example embodiment.

FIG. 5 is a view with order data and a utility toolbar showing a tip, in accordance with an example embodiment. In an example embodiment, the platform might display view 500 when a user clicks on tab 501, which includes a label "Help & Tips (1)" indicating that this particular user has one tip. A summary of the tip is shown in a numbered list in tabbed window 502: "Increase exposure and ROI by scheduling non-guaranteed inventory." Above the tip displayed in the list in tabbed window 502 is a link label 503 ("Visit our Help Center") that allows the user to go to a global help center for the platform, which might include online help for both substantive (e.g., workflow) and technical (e.g., user interface) questions, in an example embodiment. In an alternative example embodiment, the platform might also display a link label to a global tips center for the platform, which provides information regarding recommended actions or practices, rather than online help. Below the tip displayed in the list in tabbed window 502 is a link label 504 which allows the user to learn more about the tip, e.g., the details of the tip, as opposed to simply the tip's summary, in a dialog box that the platform displays if the user clicks on the link label. In an alternative example embodiment, if the user clicks on the link label 504, the platform might display a page feature cue that comprises a small descriptive dialog box with an arrow pointing to particular information (e.g., order data) in view 500. It will be appreciated that the tips listed in the list are context-dependent and relate to the order data shown outside the boundaries of the list in tabbed window 502, e.g., the order data for the ABC Energy Summer Campaign. It will also be appreciated that the platform locates tabbed window 502 contiguous to the utility toolbar in view 500 so that tabbed window 502 does not completely obstruct the displayed order data for the ABC Energy Summer Campaign, allowing a user to see and work with both the order data and the list in tabbed window 502 at the same time.

Figure 6A:
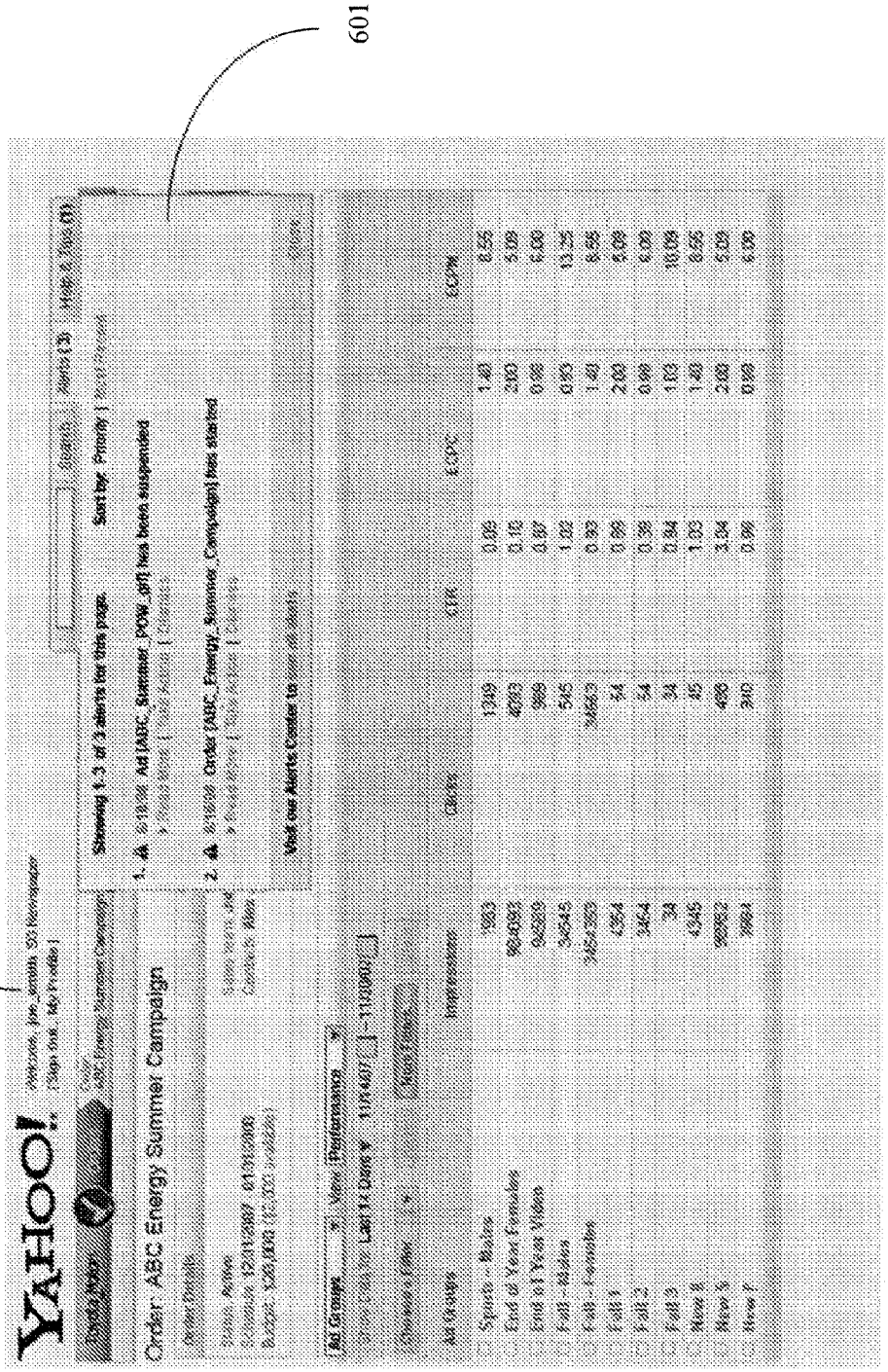
FIGS. 6A and 6B are views showing the affect of dismissal of an alert by a particular user, in accordance with an example embodiment.
Figure 6B:
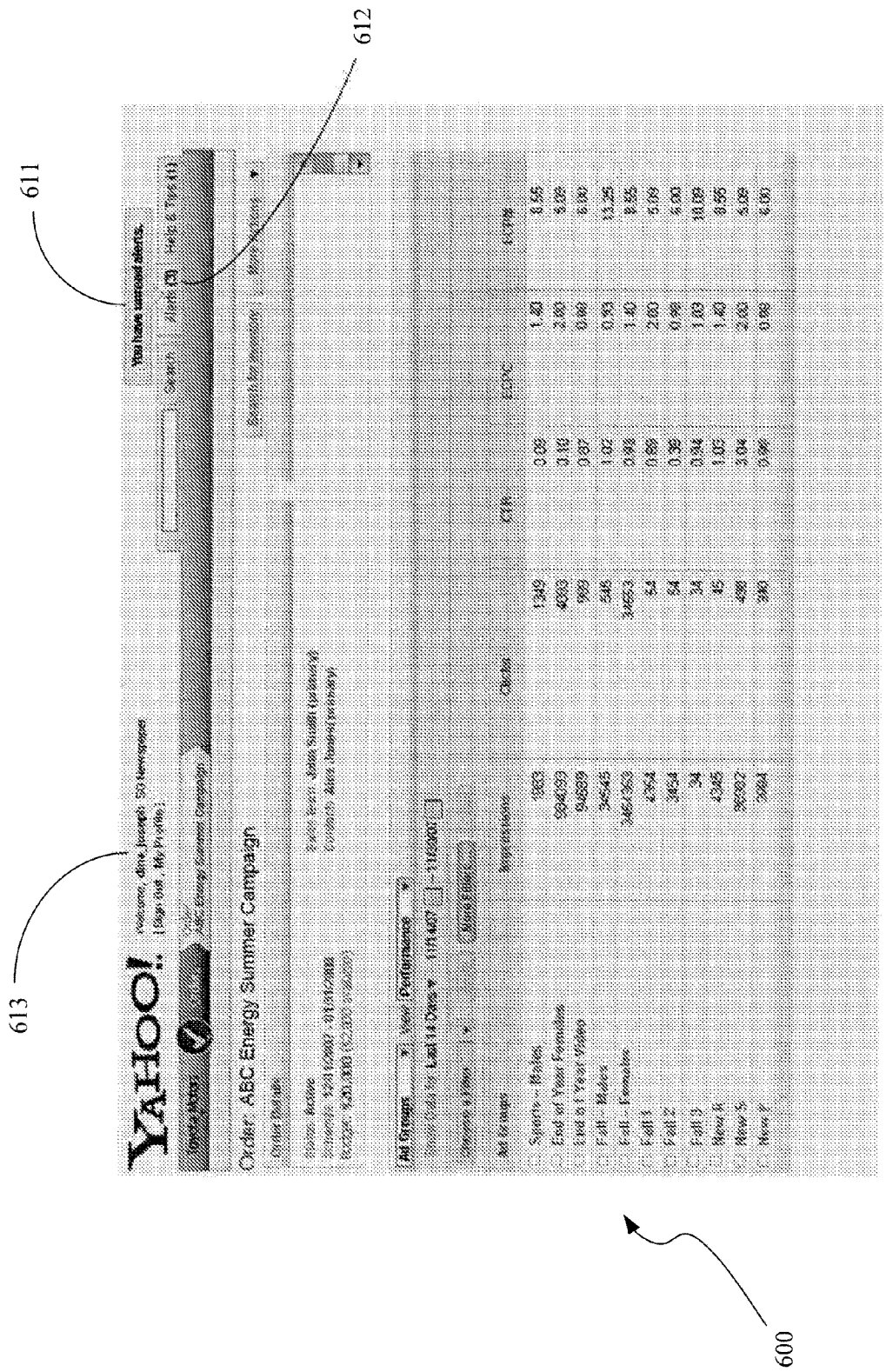

FIGS. 6A and 6B are views showing the affect of dismissal of an alert by a particular user, in accordance with an example embodiment. FIG. 6A shows a view 600 which includes a tabbed window 601 indicating that the platform has three alerts (e.g., "Alerts (3)" and "Showing 1-3 alerts for this page.") relating to the order identified as the ABC Energy Summer Campaign for the current user 602, namely, joe_smith. However, the tabbed window 601 displays (e.g., by creation date and summary) a list of only two alerts, indicating that this user has dismissed the other alert. In an example embodiment, if this user were to log out, log back in, and then navigate to the order for ABC Energy Summer Campaign, the tabbed window 601 would indicate that the user has only two alerts. FIG. 6B shows the same view 600 following the log in of a subsequent user 613, namely, dina_joseph, who also has access rights to the data for the order identified as the ABC Energy Summer Campaign. Since the subsequent user has not dismissed any alerts, the labeled tab 612 shows that there are still three alerts for this user. Similarly, the notification balloon 611 indicates that this user has unread alerts.

Figure 7:
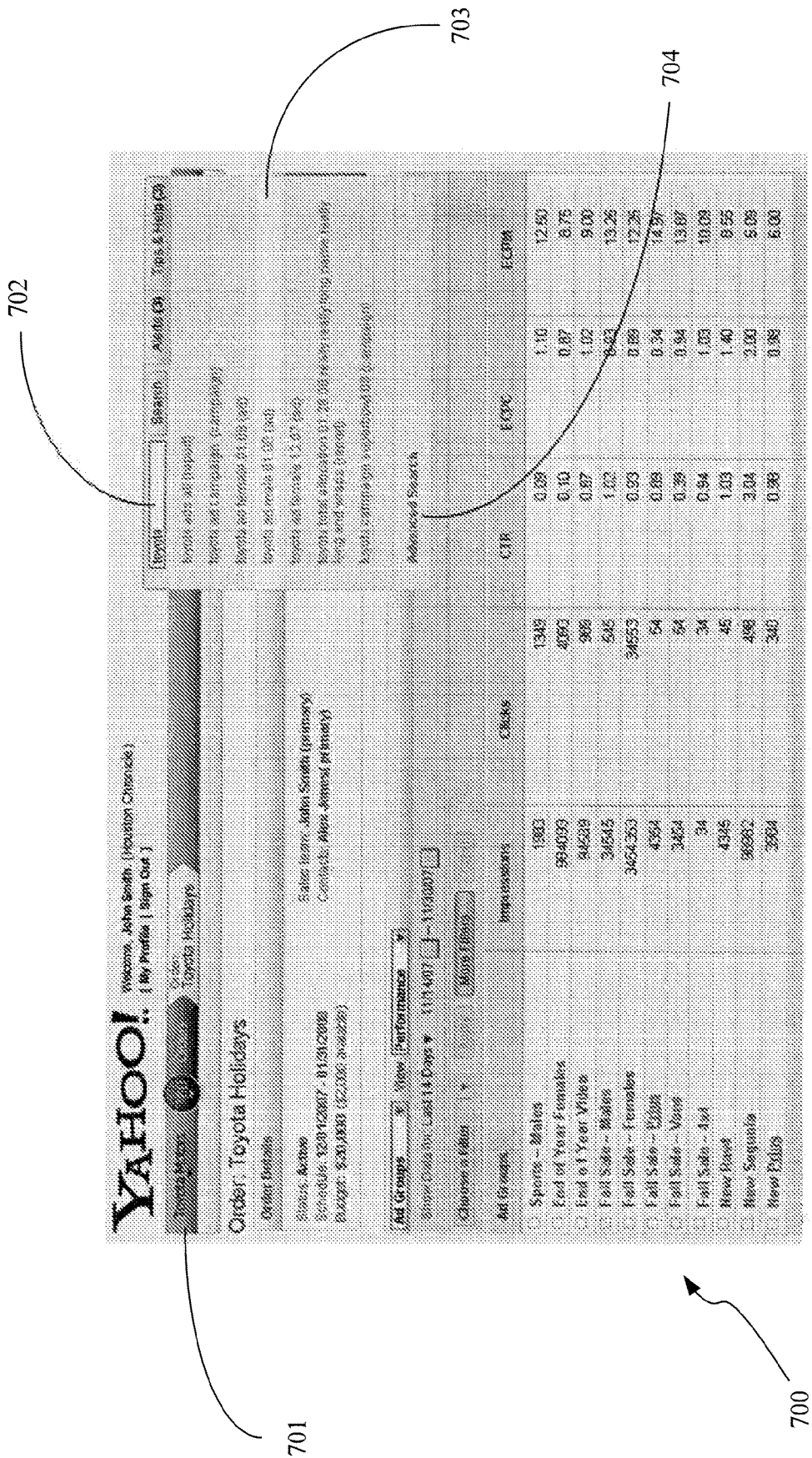
FIG. 7 is a view with order data and a utility toolbar showing a combo box with data objects relevant to the characters of a search term, in accordance with an example embodiment.

FIG. 7 is a view with order data and a utility toolbar showing a combo box with data objects relevant to the characters of a search term, in accordance with an example embodiment. As described earlier, a user with access rights might see view 700 after clicking on the label "Orders" in the digital dashboard and then clicking on an order from the list of accessible orders displayed by the platform. This sequence is captured in the hierarchy shown in the horizontal bar 701, where the label "Orders" is followed by the label "Order: Toyota Holidays". View 700 also includes a utility toolbar which is located in the standardized location (e.g., the upper right corner) and contains the standardized controls. In view 700, the toolbar includes a combo box 703 with a textbox 702 where a user might enter the characters of a search term. The combo box 703 includes a link label 704 which a user can click on to navigate to a view that enables advanced search.

In an example embodiment, a user might enter a fixed number of characters from a search term into textbox 702. Then the platform might display a list of data objects which are relevant to the characters in combo box 703. The list might include a description of each relevant data object maintained (e.g., persistently stored) by the platform, along with the data object's object category. For example, as shown in FIG. 7, if the user enters "toyota" into textbox 702, the platform might display "toyota ad male 01.08" in combo box 703, among other data objects. As might be guessed, the object category for "toyota ad male 01.08" is an "ad". If the user clicks on the object, the platform might display the ad itself, rather than a page with search results. In an example embodiment, other searchable object categories might include orders, users, accounts, creatives, ads, linked companies, sites, line items, ad groups, rate cards, reports, and approvals.

In an example embodiment, the platform might store the data objects in a server accessed through AJAX techniques and launch a search for data objects after the user has enter the fixed number of characters, e.g., 3, 4, 5, etc. The platform might conduct a new search of the server each time the user enters another search-term character, in order to generate a list of increasing relevancy. It will be appreciated that AJAX (asynchronous JavaScript and XML) is a set of interrelated web development techniques used for creating interactive web application programs. Using these techniques, a web application program can retrieve data from a server asynchronously in the background without interfering with the display and behavior of the page that is currently displayed. Typically, a web application retrieves data from a server using the XMLHttpRequest API (application programming interface) or through the use of Remote Scripting in browsers that do not support that API. Despite the acronym AJAX, the use of JavaScript, XML, and asynchrony is not required in all AJAX implementations. It will also be appreciated that the data objects are data objects used in the platform, not prior search terms or queries, as might be the case in a web application such as Yahoo! Search's Instant Search. However, in an example embodiment, the platform might use a library based on Instant Search in order to populate the list of data objects displayed by combo box 703.

In an example embodiment, the platform locates combo box 703 contiguous to the utility toolbar in view 700 so that combo box 703 does not completely obstruct the displayed order data for Toyota Holidays, allowing a user to see and work with both the order data and the list of data objects in the combo box 703 at the same time. However, the data objects on that list might not relate to the order data, but instead relate to other orders and/or accounts to which the user has access.

Figure 8A:
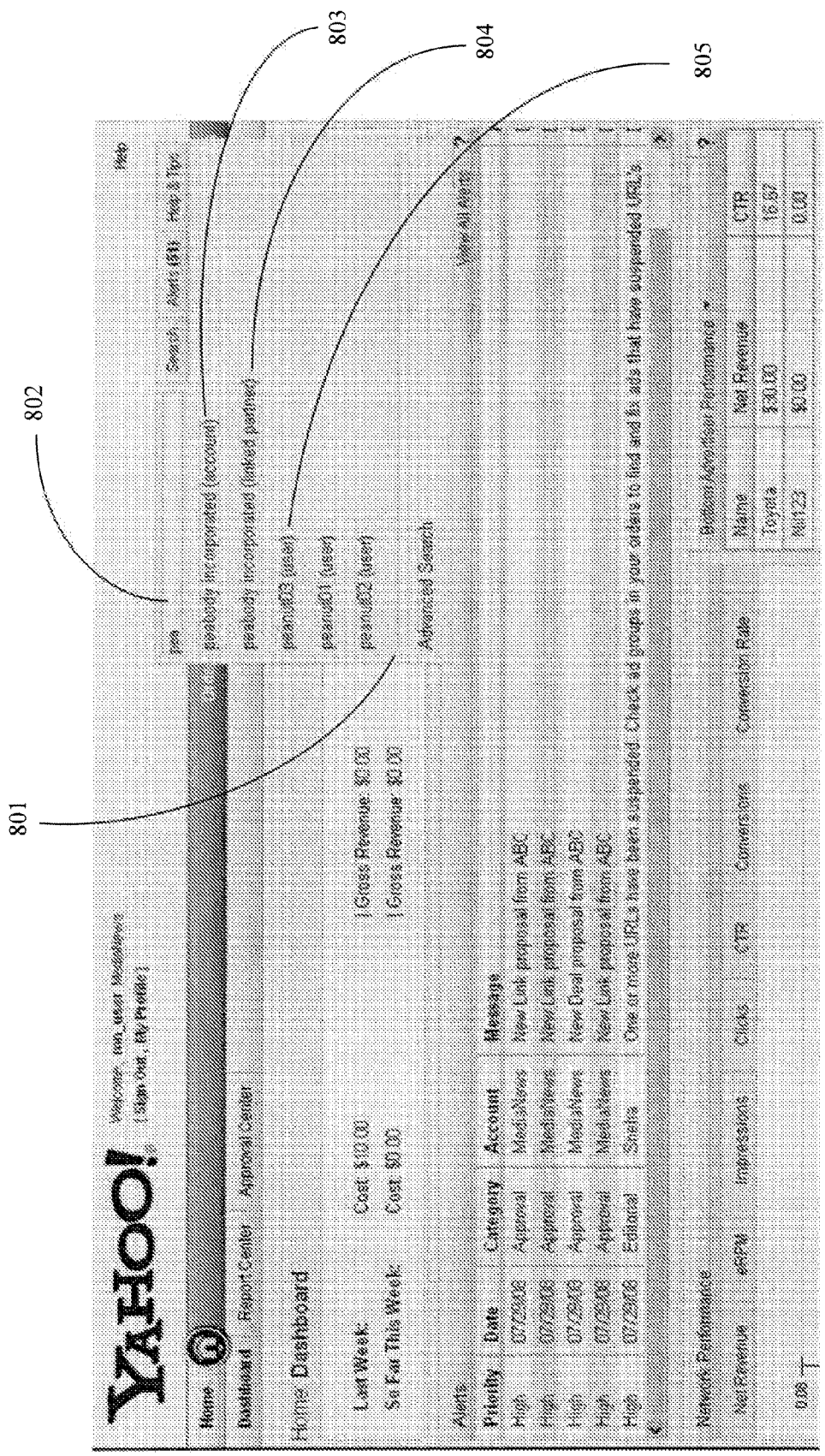
FIGS. 8a and 8b are a view with a combo box for searching and a related page with search results, respectively, in accordance with an example embodiment.
Figure 8B:
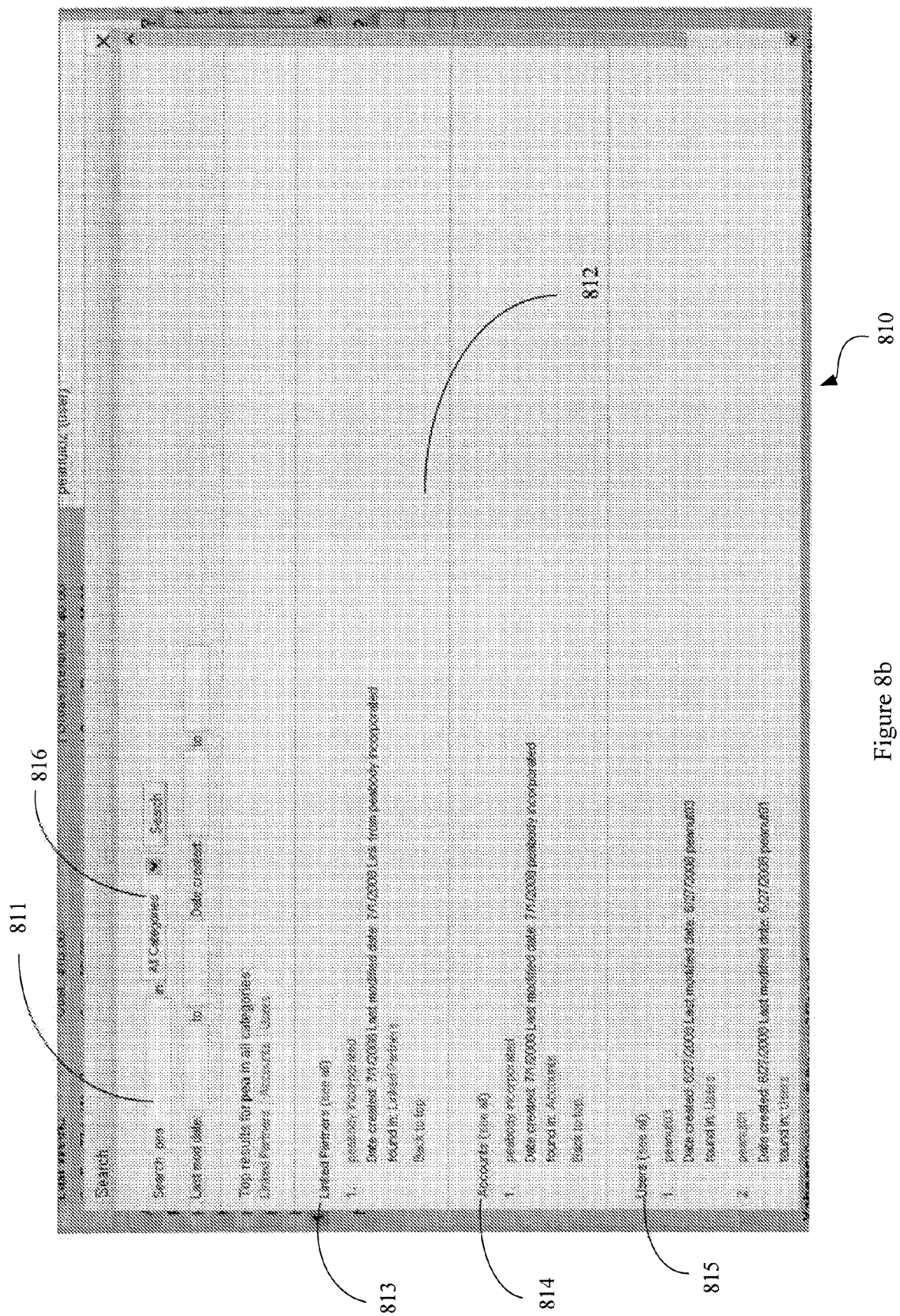

FIGS. 8a and 8b are a view with a combo box for searching and a related page with search results, respectively, in accordance with an example embodiment. For the most part, view 800 in FIG. 8a is similar to view 700 shown in FIG. 7. View 800 includes a utility toolbar with combo box 801 which has a textbox 802 where a user might enter the characters of a search term, e.g., "pea". The combo box 801 includes a list of each data object which is maintained by the platform and which is relevant to the search term, along with an object category for the data object. For example, the list in combo box 801 includes the following data objects: (a) data object 803 which is described as "peabody incorporated" and whose object category is "account"; (b) data object 804 which is also described as "peabody incorporated" and whose object category is "linked partner"; and (c) data object 805 which is described as "peanut03" and whose object category is "user".

FIG. 8b shows a page of search results which the platform might display if the user launches a search (e.g., by clicking a button labeled "Search") on the search term "pea". Page 810 includes a textbox 811 which reproduces the search term (e.g., "pea") and list 812 of data objects that are maintained by the platform and that are relevant to the search term. In an example embodiment, list 812 groups data objects by object category for purposes of display. Thus, "peabody incorporated" appears as a data object in the group 813 for the object category "Linked Partners". A data object described as "peabody incorporated" also appears in the group 814 for the object category "Accounts". A data object described as "peanut03" appears in the group 815 for the object category "Users". It will be appreciated that these three data objects also appeared on the list included in combo box 801 in FIG. 8a. Page 810 also includes a list box 816 that allows a user to select an object category for further searching. The object category shown in list box 816 is "All Categories", which is the default value that is displayed in list box 816 after a user launches a search (e.g., clicks the button labeled "Search") on a search term entered in textbox 802.

Figure 9A:
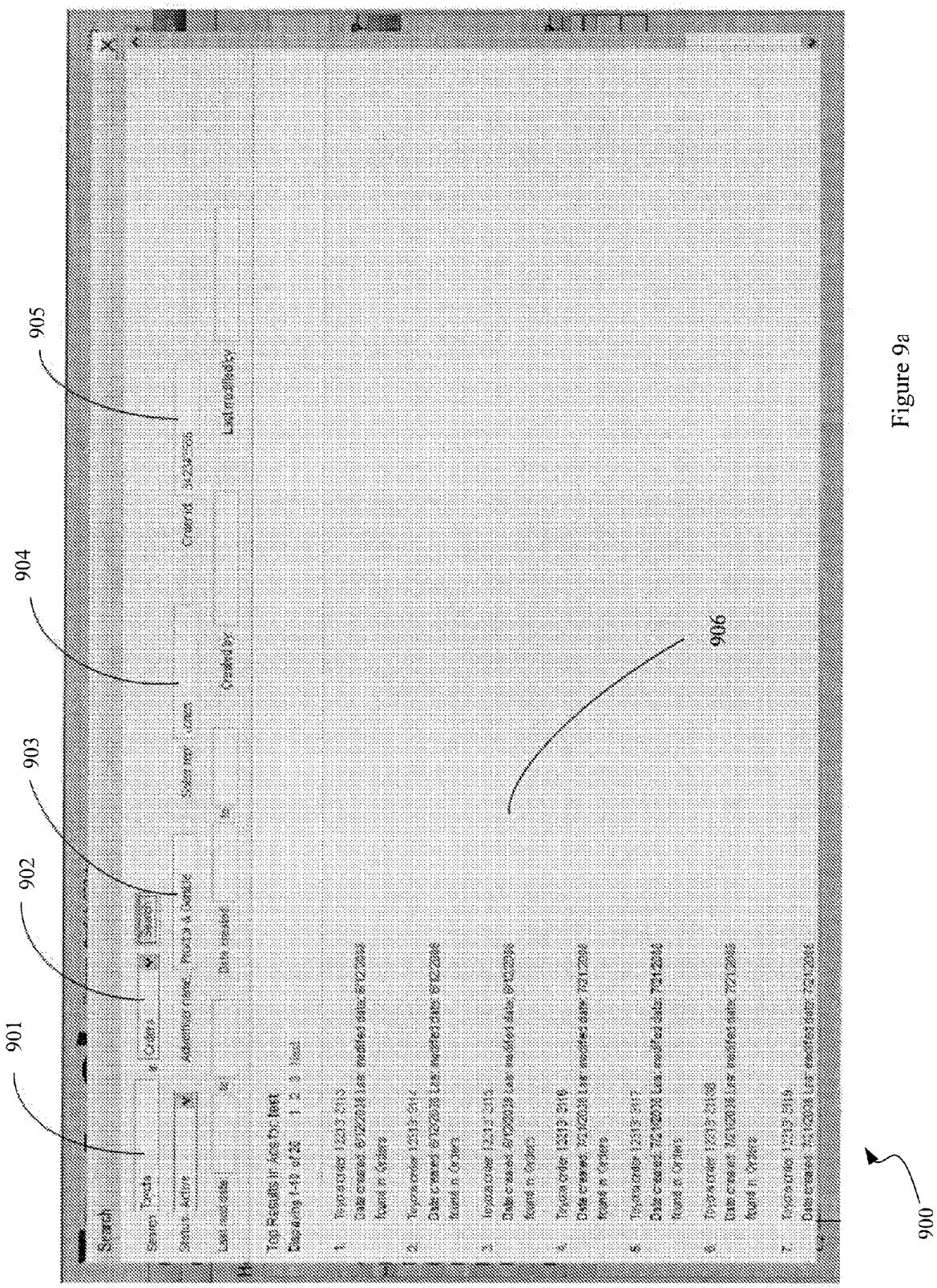
FIGS. 9a and 9b are pages with search results and entry boxes related to an object category, in accordance with an example embodiment.

FIG. 9a is a page with search results and entry boxes related to an object category, in accordance with an example embodiment. The platform might display page 900 in FIG. 9a after the user selects a new object category in list box 816 shown in FIG. 8b. Page 900 includes textbox 901, with a search term "Toyota", and a list box 902 which lists the object categories of data objects maintained by the platform. In FIG. 9a, "Orders" is the object category previously selected by the user and reproduced in list box 902. In an example embodiment, the selected object category determines the search results displayed in list 906 and the attributes of some of the entry boxes, e.g., 903, 904, and 905. For example, when the object category is "Orders", the platform might display: (a) a list 906 of data objects comprised of orders; (b) an entry box 903 for the "Advertiser Name"; (c) an entry box 904 for the "Sales rep"; and (d) an entry box 905 for the "Order id". It will be appreciated that such entry boxes might not be appropriate for an object category such as "Ads". In an example embodiment, Page 900 might also include entry boxes for status (e.g., Active) and for date ranges related to the creation date and last modification date of a data object, as well as entry boxes for the creator and last modifier of a data object, as is also shown in FIG. 9a.

On page 900, the user has entered a value of "Proctor & Gamble" in entry box 903, a value of "Jones" in entry box 904, and a value of "342343566" in entry box 905. If the user then clicks the button labeled "Search" on page 900, the platform returns and displays search results that are orders relevant to the search term (e.g., "Toyota") which meet the restrictions created by the entered values in entry boxes 903, 904, and 905, e.g., the advertiser is Proctor & Gamble, the sales rep is Jones, and the order id is 342343566. It will be appreciated that such a restricted search ordinarily requires the use of an additional page dedicated to displaying entry boxes for a generalized advanced search.

Figure 9B:
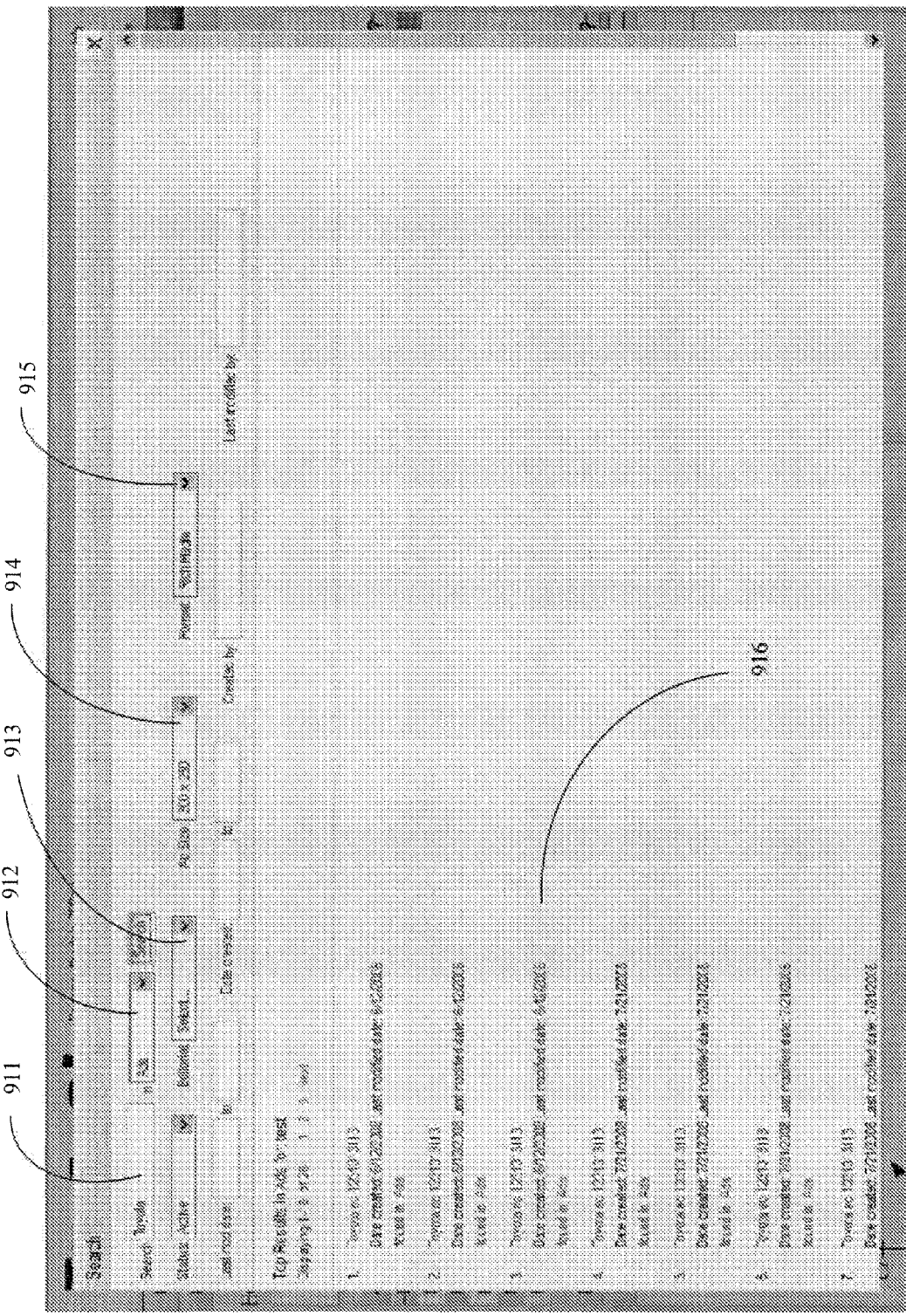

FIG. 9b is another page with search results and entry boxes related to an object category, in accordance with an example embodiment. Here again, the platform might display page 910 in FIG. 9b after the user selects a new object category in list box 816 shown in FIG. 8b. Page 910 includes textbox 911, with a search term "Toyota", and a list box 912 which lists the object categories of data objects maintained by the platform. In FIG. 9b, "Ads" is the object category previously selected by the user and reproduced in list box 912. In an example embodiment, the selected object category determines the search results displayed in list 916 and the attributes of some of the entry boxes, e.g., 913, 914, and 915. For example, when the object category is "Ads", the platform might display: (a) a list 916 of data objects comprised of ads; (b) an entry box 913 for "Editorial" searching based on the content (e.g., text) in an ad, which requires further input (e.g., a string of characters) by the user as indicated by the ellipsis (e.g., "Select . . . "); (c) an entry box 914 for the "Ad Size" (e.g., for a display ad); and (d) an entry box for "Format". It will be appreciated that such entry boxes might not be appropriate for an object category such as "Orders". In an example embodiment, Page 910 might also include entry boxes for status (e.g., Active) and for date ranges related to the creation date and last modification date of a data object, as well as entry boxes for the creator and last modifier of a data object, as is also shown in FIG. 9b.

On page 910, the user has entered a value of "300×250" in entry box 914 and a value of "Rich Media" in entry box 915. If the user then clicks the button labeled "Search" on page 910, the platform returns and displays search results that are ads relevant to the search term (e.g., "Toyota") which meet the restrictions created by the entered values in entry boxes 914 and 915, e.g., the ad size is 300×250 and the format is rich media. Here again, it will be appreciated that such a restricted search ordinarily requires the use of an additional page dedicated to displaying entry boxes for a generalized advanced search.

Figure 10:
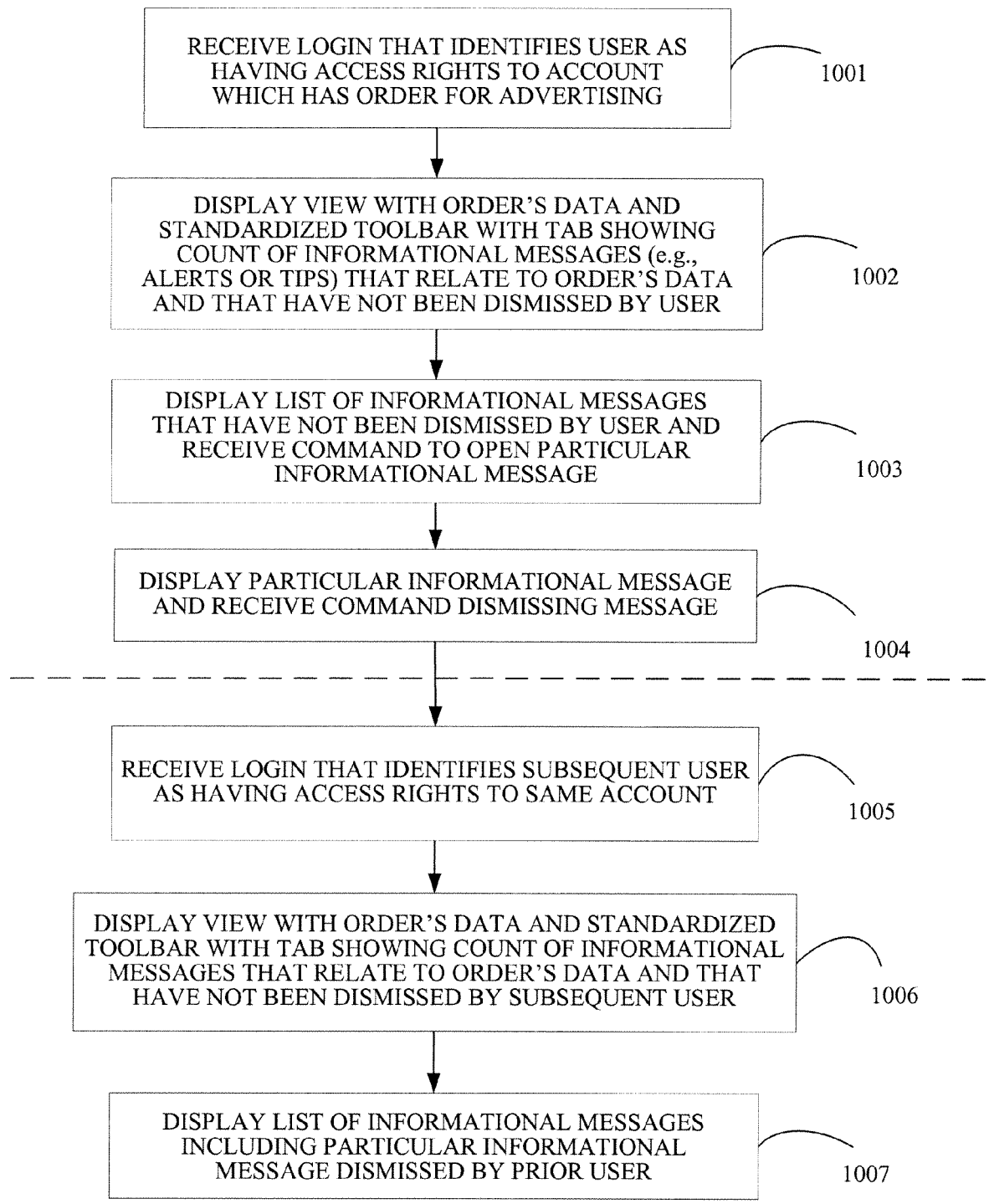
FIG. 10 is a simplified flowchart diagram illustrating a process for listing informational messages that have not been dismissed by a particular user, in accordance with an example embodiment.

FIG. 10 is a simplified flowchart diagram illustrating a process for listing informational messages that have not been dismissed by a particular user, in accordance with an example embodiment. In the process's first operation 1001, the platform receives a login that identifies a user (e.g., account manager Joe Smith in the use case above) as having access rights to an account which has an order for advertising. In the next operation 1002, the platform displays a view with the order's data and a standardized (e.g., with respect to location and controls) toolbar with a tab showing a count of the informational messages (e.g., alerts or tips) that relate to the order's data and that have not been dismissed by that user. In operation 1003, the platform displays a tabbed window with a list of informational messages that have not been dismissed by that user, when the user clicks on the tab. Then the platform receives a command from the user to open a particular informational message. In operation 1004, the platform displays the informational message and then receives a command from the user dismissing the message.

The process continues in operation 1005, where the platform receives a login that identifies a subsequent user (e.g., sales representative Dina Joseph in the use case above) as having access rights to same account. In operation 1006, the platform displays a view with the order's data and the standardized toolbar with a tab showing a count of the informational messages that relate to the order's data and that have not been dismissed by the subsequent user, as opposed to the prior user. Then in operation 1007, the platform displays a tabbed window with a list of informational messages including the particular informational message dismissed by the prior user, when the subsequent user clicks on the tab. As suggested earlier, this process facilitates asynchronous collaboration by a team of users.

Figure 11:
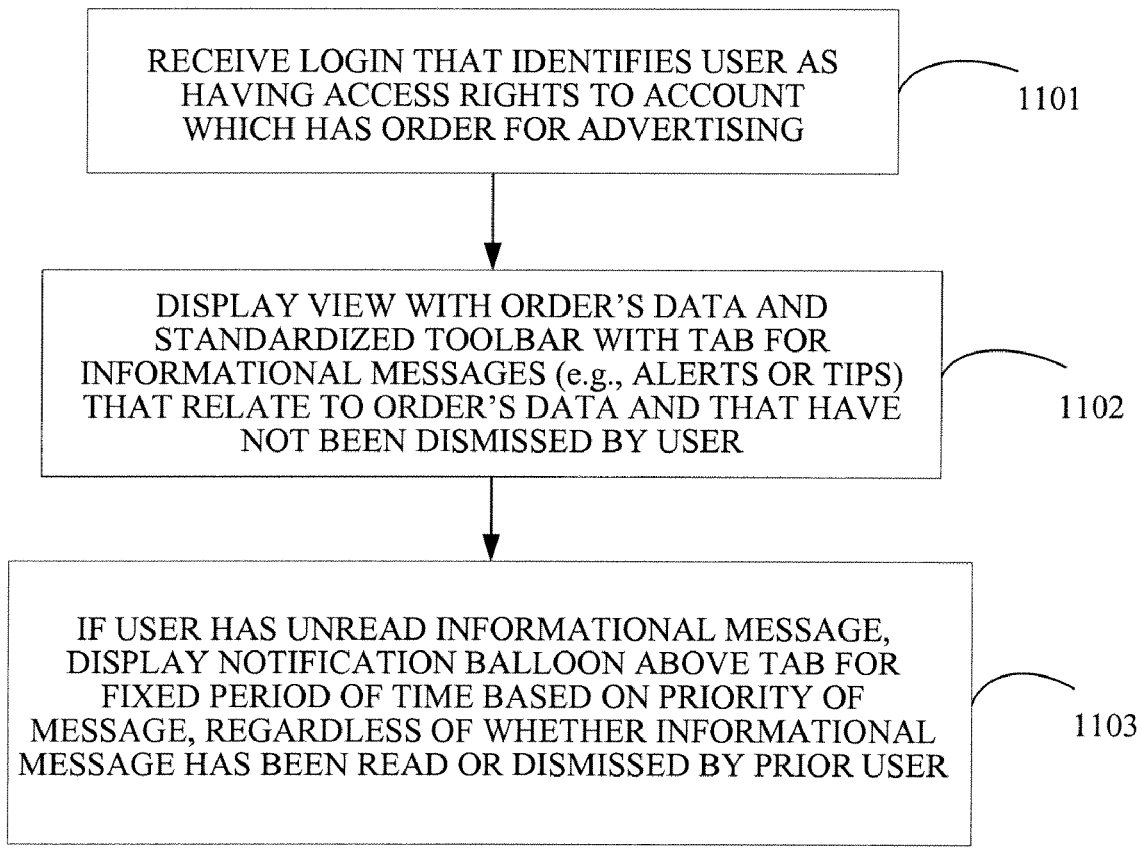
FIG. 11 is a simplified flowchart diagram illustrating a process for notifying a particular user of his/her unread informational messages, in accordance with an example embodiment.

FIG. 11 is a simplified flowchart diagram illustrating a process for notifying a particular user of his/her unread informational messages, in accordance with an example embodiment. In the process's first operation 1101, the platform receives a login that identifies a user as having access rights to an account which has an order for advertising. In the next operation 1102, the platform displays a view with the order's data and a standardized toolbar with a tab showing a count of the informational messages that relate to the order's data and that have not been dismissed by that user. Then in operation 1103, if the user has an unread informational message, the platform displays a notification balloon above the tab for a fixed period of time based on the priority of the message, regardless of whether the informational message has been read or dismissed by a prior user.

Figure 12:
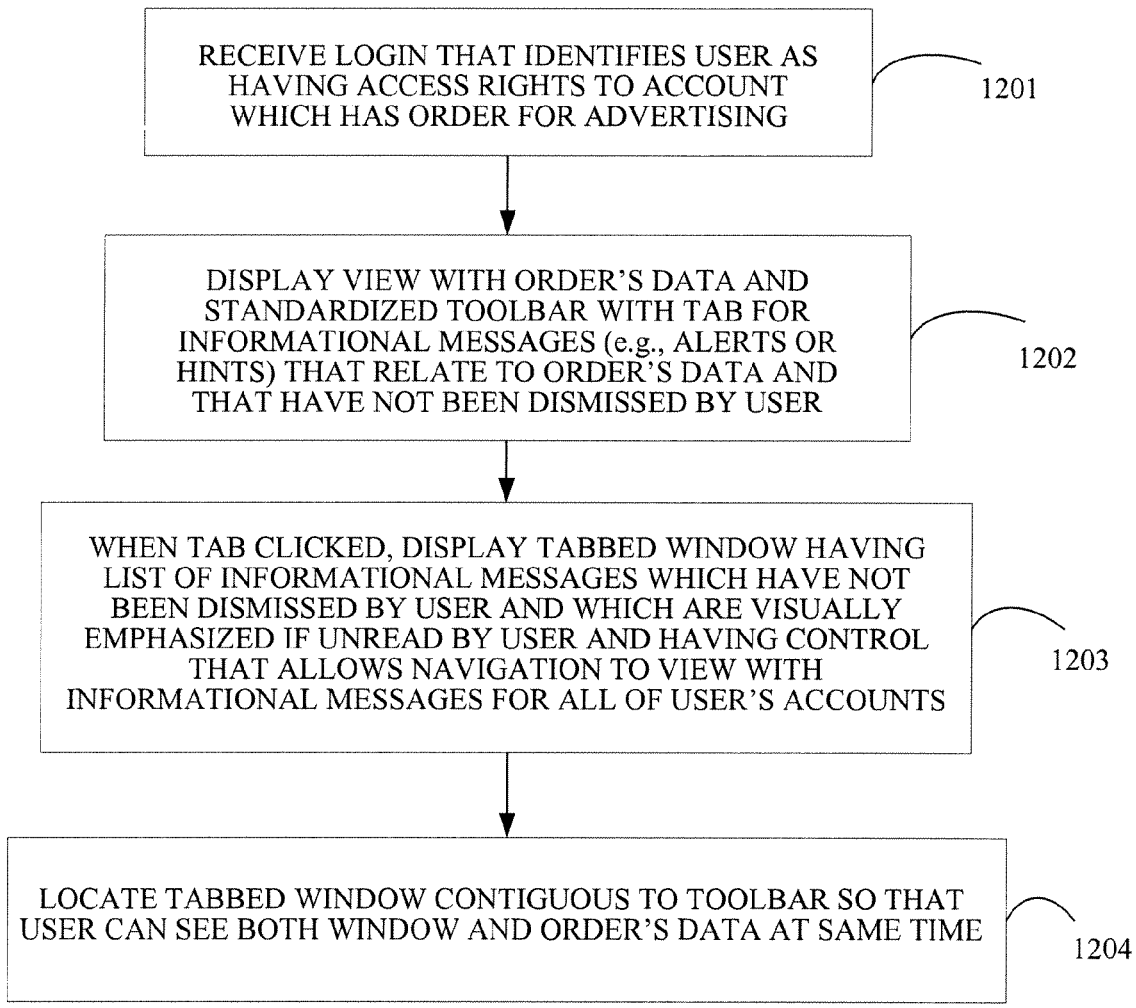
FIG. 12 is a simplified flowchart diagram illustrating a process for overlaying a list of informational messages that have not been dismissed by a particular user, in accordance with an example embodiment.

FIG. 12 is a simplified flowchart diagram illustrating a process for overlaying a list of informational messages that have not been dismissed by a particular user, in accordance with an example embodiment. In the process's first operation 1201, the platform receives a login that identifies a user as having access rights to an account which has an order for advertising. In the next operation 1202, the platform displays a view with the order's data and a standardized toolbar with a tab for informational messages that relate to the order's data and that have not been dismissed by that user. In operation 1203, after the user clicks on the tab, the platform displays a tabbed window (a) having a list of informational messages which have not been dismissed by the user and which are visually emphasized if unread by the user and (b) having a control that allows navigation to a view with informational messages for all of that user's accounts. In operation 1204, the platform locates the tabbed window contiguous to the toolbar so that the user can see both the tabbed window and the order's data at same time. It will be appreciated that operations 1203 and 1204 take place simultaneously, in an example embodiment.

Figure 13:
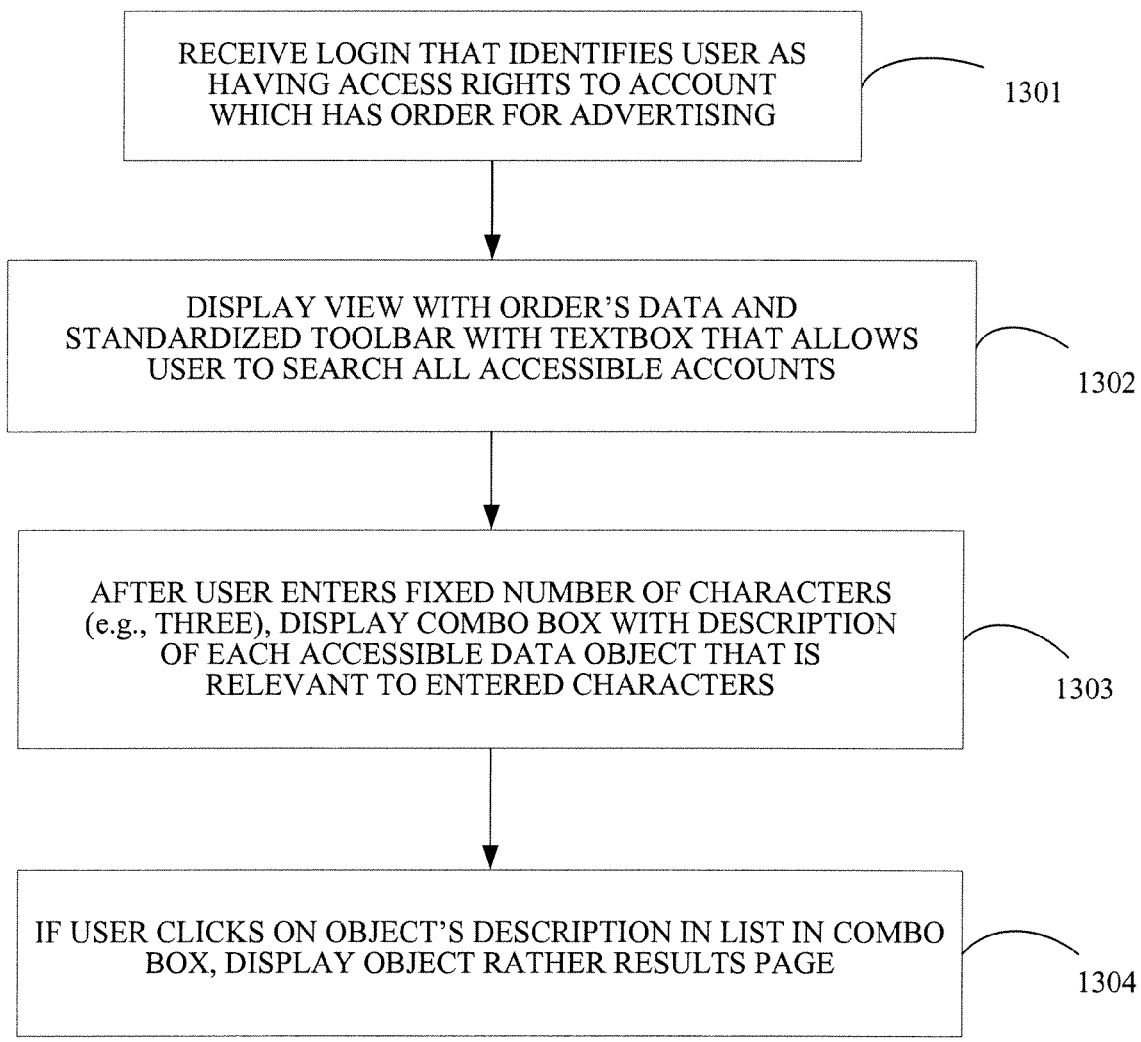
FIG. 13 is a simplified flowchart diagram illustrating a process for displaying a combo box of objects relevant to the characters of a search term entered by a user, in accordance with an example embodiment.

FIG. 13 is a simplified flowchart diagram illustrating a process for displaying a combo box of objects relevant to the characters of a search term entered by a user, in accordance with an example embodiment. In the process's first operation 1301, the platform receives a login that identifies a user as having access rights to an account which has an order for advertising. In the next operation 1302, the platform displays a view with the order's data and a standardized toolbar with a textbox that allows the user to search all accounts accessible by the user. After the user enters a fixed number of characters (e.g., three), the platform displays a combo box with a description of each accessible data object that is relevant to the entered characters, in operation 1303. Then, in operation 1304, if the user clicks on an object's description in the list in the combo box, the platform displays the object, rather than a results page.

Figure 14:
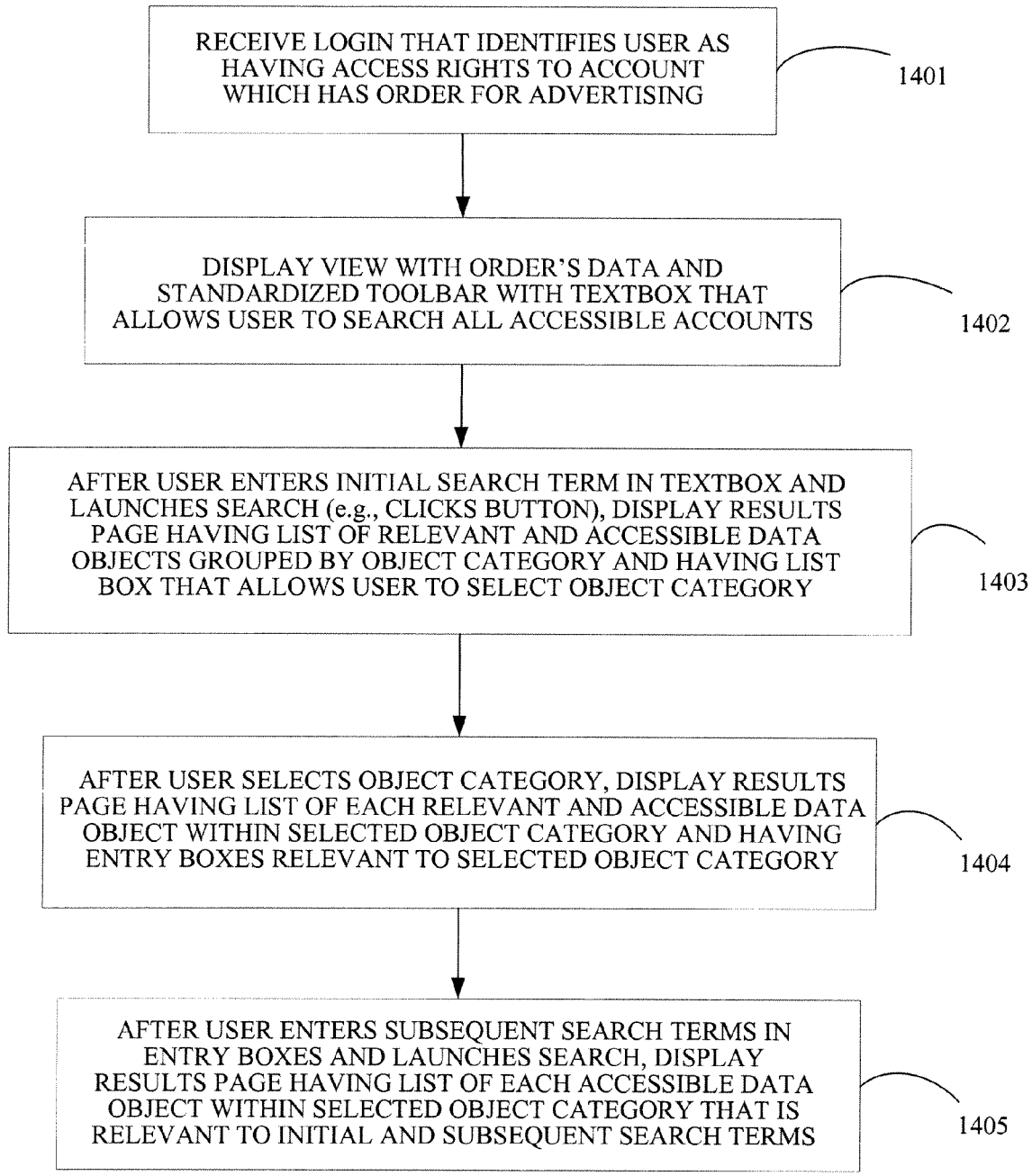
FIG. 14 is a simplified flowchart diagram illustrating a process for displaying a page of search results with entry boxes related to an object category, in accordance with an example embodiment.

FIG. 14 is a simplified flowchart diagram illustrating a process for displaying a page of search results with entry boxes related to an object category, in accordance with an example embodiment. In the process's first operation 1401, the platform receives a login that identifies a user as having access rights to an account which has an order for advertising. In the next operation 1402, the platform displays a view with the order's data and a standardized toolbar with a textbox that allows the user to search all accounts accessible by the user. In operation 1403, after the user enters an initial search term in the textbox and launches a search (e.g., clicks a button), the platform displays a results page having (a) a list of relevant (e.g., to the search term) and accessible data objects grouped by object category, and (b) a list box that allows the user to select an object category. Then in operation 1404, after the user selects an object category, the platform displays a results page having (a) having a list of each relevant and accessible data object within the selected object category, and (b) entry boxes relevant to the selected object category. In operation 1405, after the user enters one or more subsequent search terms in the entry boxes (e.g., in the entry boxes that are relevant to the selected object category) and launches a search, the platform display a results page having a list of each accessible data object within the selected object category that is relevant to the initial and the subsequent search terms.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the invention have been described in some detail for purposes of clarity of understanding, it will be apparent that certain changes and modifications can be practiced within the scope of the following claims. For example, the utility toolbar might be implemented as a browser toolbar add-on rather than as part of the platform itself. Accordingly, the present embodiments are to be considered as illustrative and not restrictive, and the invention is not to be limited to the details given herein, but may be modified within the scope and equivalents of the following claims. In the following claims, elements and/or steps do not imply any particular order of operation, unless explicitly stated in the claims or implicitly required by the specification and/or drawings.

What is claimed is:

1. A computer-readable medium persistently storing software that when executed instructs one or more processors to perform the following operations:
   receive a login that identifies a user as a user allowed access to an account maintained by an online advertising management platform, wherein the account comprises data relating to an order for advertising provided by an ad network affiliated with the online advertising management platform;
   display a view in a graphical user interface including a window displaying some or all of the data relating to the order;
   display a toolbar in a standardized location relative to the window, wherein the toolbar includes a textbox that allows the user to search for data relating to all accounts to which the user has access;
   display a combo box after the user enters a fixed number of characters in the textbox, wherein the combo box includes a list of descriptions of each data object maintained in the advertising management platform that is accessible and that is relevant to the fixed number of characters, wherein the combo box further includes an object category for each data object described in the list, and wherein the object category is selected from the group consisting of orders, users, accounts, creatives, ads, linked companies, sites, line items, ad groups, rate cards, reports, and approvals;
   locate the combo box contiguous to the toolbar over some but not all of the view displaying the data relating to the order so that the user can see both the combo box and the view at the same time; and
   display a data object, rather than a page of search results, after the user clicks a description of a data object from the combo box.

2. The computer-readable medium of claim 1, wherein the fixed number of characters is about three.

3. The computer-readable medium of claim 1, wherein the data object is persistently stored by a server accessible with AJAX techniques.

4. The computer-readable medium of claim 1, wherein the advertising comprises display advertising.

5. The computer-readable medium of claim 1, wherein the advertising comprises online display advertising.

6. The computer-readable medium of claim 1, wherein the toolbar further comprises a labeled tab for a tabbed window which displays a list of each informational message which relates to the displayed data and which has not been dismissed by the user, regardless of whether the informational message has been dismissed by another user allowed access to the account.

7. The computer-readable medium of claim 6, wherein each informational message is an alert that describes an exception to a regular workflow for the account.

8. The computer-readable medium of claim 6, wherein each informational message is a tip that describes a recommended action or practice for a workflow for the account.

9. A computer-implemented method, comprising:
   receiving a login that identifies a user as a user allowed access to an account maintained by an online advertising management platform, wherein the account comprises data relating to an order for advertising provided by an ad network affiliated with the online advertising management platform;
   displaying a view in a graphical user interface including a window displaying some or all of the data relating to the order;
   displaying a toolbar in a standardized location relative to the window, wherein the toolbar includes a textbox that allows the user to search for data relating to all accounts to which the user has access;
   displaying a combo box after the user enters a fixed number of characters in the textbox, wherein the combo box includes a list of descriptions of each data object maintained in the advertising management platform that is accessible and that is relevant to the fixed number of characters, wherein the combo box further includes an object category for each data object described in the list, and wherein the object category is selected from the group consisting of orders, users, accounts, creatives, ads, linked companies, sites, line items, ad groups, rate cards, reports, and approvals;
   locating the combo box contiguous to the toolbar over some but not all of the view displaying the data relating to the order so that the user can see both the combo box and the view at the same time; and
   displaying a data object, rather than a page of search results, after the user clicks a description of a data object from the combo box.

10. The computer-implemented method of claim 9, wherein the fixed number of characters is about three.

11. The computer-implemented method of claim 9, wherein the data object is persistently stored by a server accessible with AJAX techniques.

12. The computer-implemented method of claim 9, wherein the advertising comprises online display advertising.

13. The computer-implemented method of claim 9, wherein the toolbar further comprises a labeled tab for a tabbed window which displays a list of each informational message which relates to the displayed data and which has not been dismissed by the user.

14. The computer-implemented method of claim 13, wherein each informational message is an alert that describes an exception to a regular workflow for the account.

15. The computer-implemented method of claim 14, wherein each informational message is a tip that describes a recommended action or practice for a workflow for the account.

16. A computer-implemented method, comprising:
- receiving a login that identifies a user as a user allowed access to an account maintained by an online advertising management platform, wherein the account comprises data relating to an order for advertising provided by an ad network affiliated with the online advertising management platform;
- displaying a toolbar, wherein the toolbar includes a textbox that allows the user to search for data relating to all accounts to which the user has access;
- displaying a combo box after the user enters a fixed number of characters in the textbox, wherein the combo box includes a list of descriptions of each data object maintained in the advertising management platform that is accessible and that is relevant to the fixed number of characters, wherein the combo box further includes an object category for each data object described in the list, and wherein the object category is selected from the group consisting of orders, users, accounts, creatives, ads, linked companies, sites, line items, ad groups, rate cards, reports, and approvals;
- locate the combo box contiguous to the toolbar over some but not all of the view displaying the data relating to the order so that the user can see both the combo box and the view at the same time; and
- displaying a data object, rather than a page of search results, after the user clicks a description of a data object from the combo box.

* * * * *